Patented Oct. 25, 1932

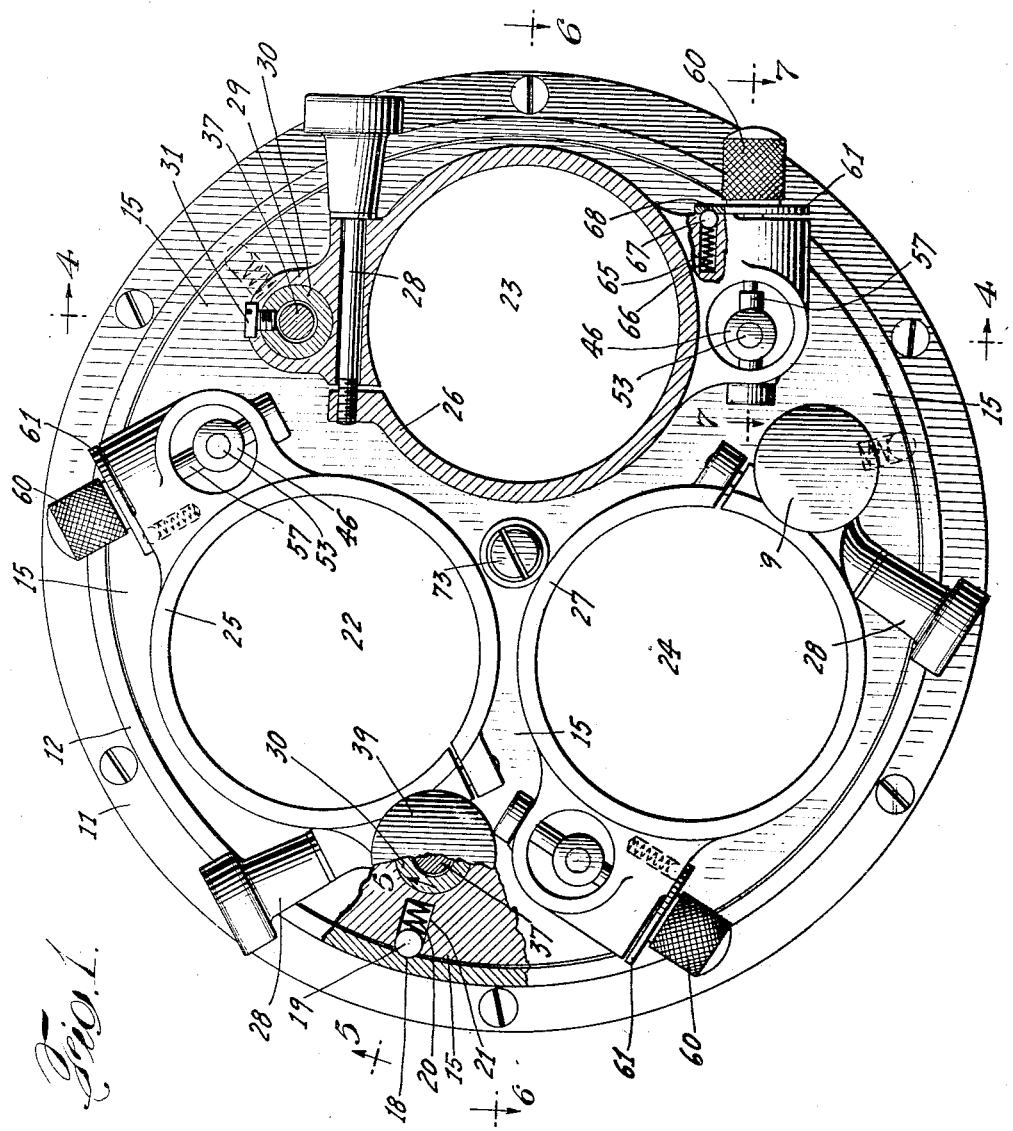

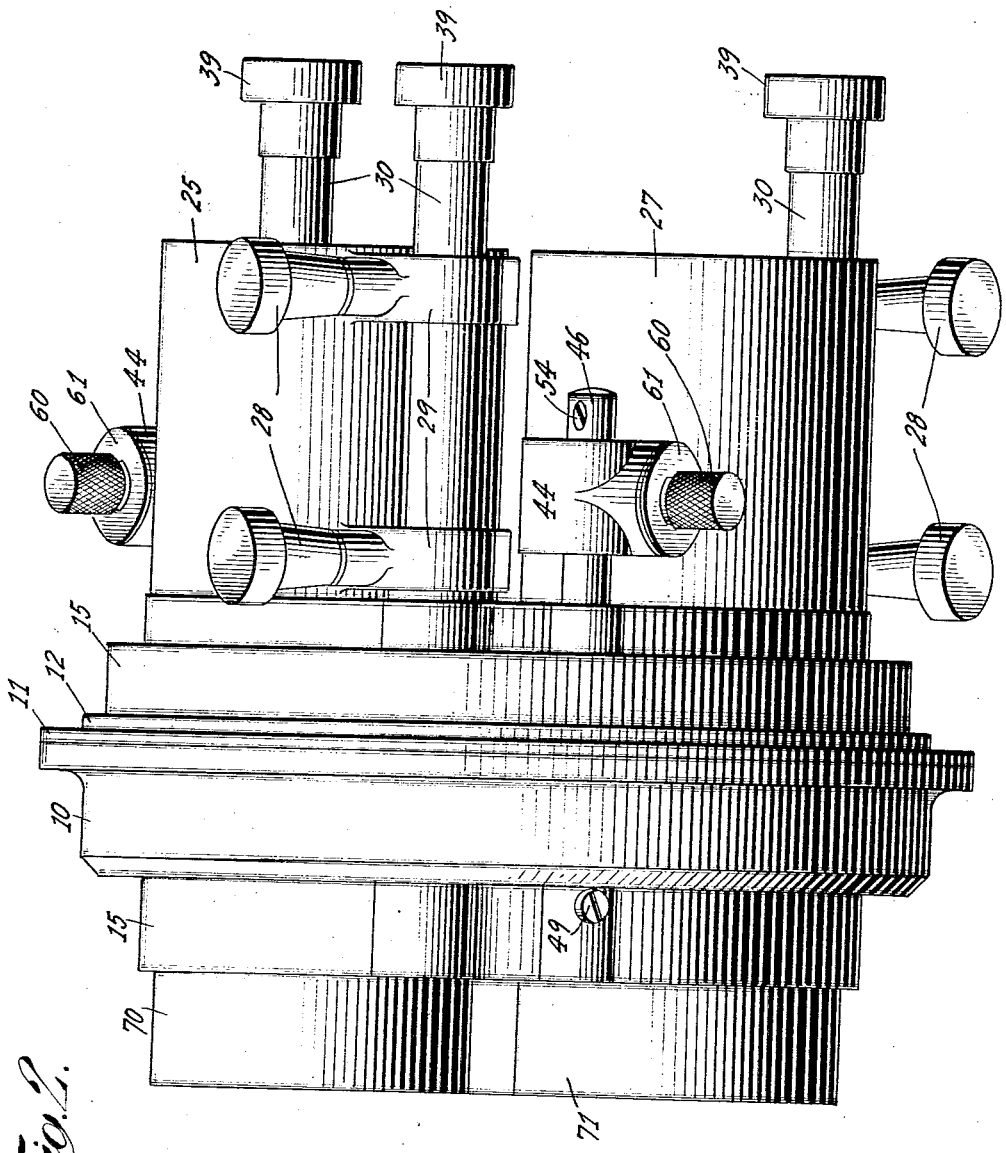

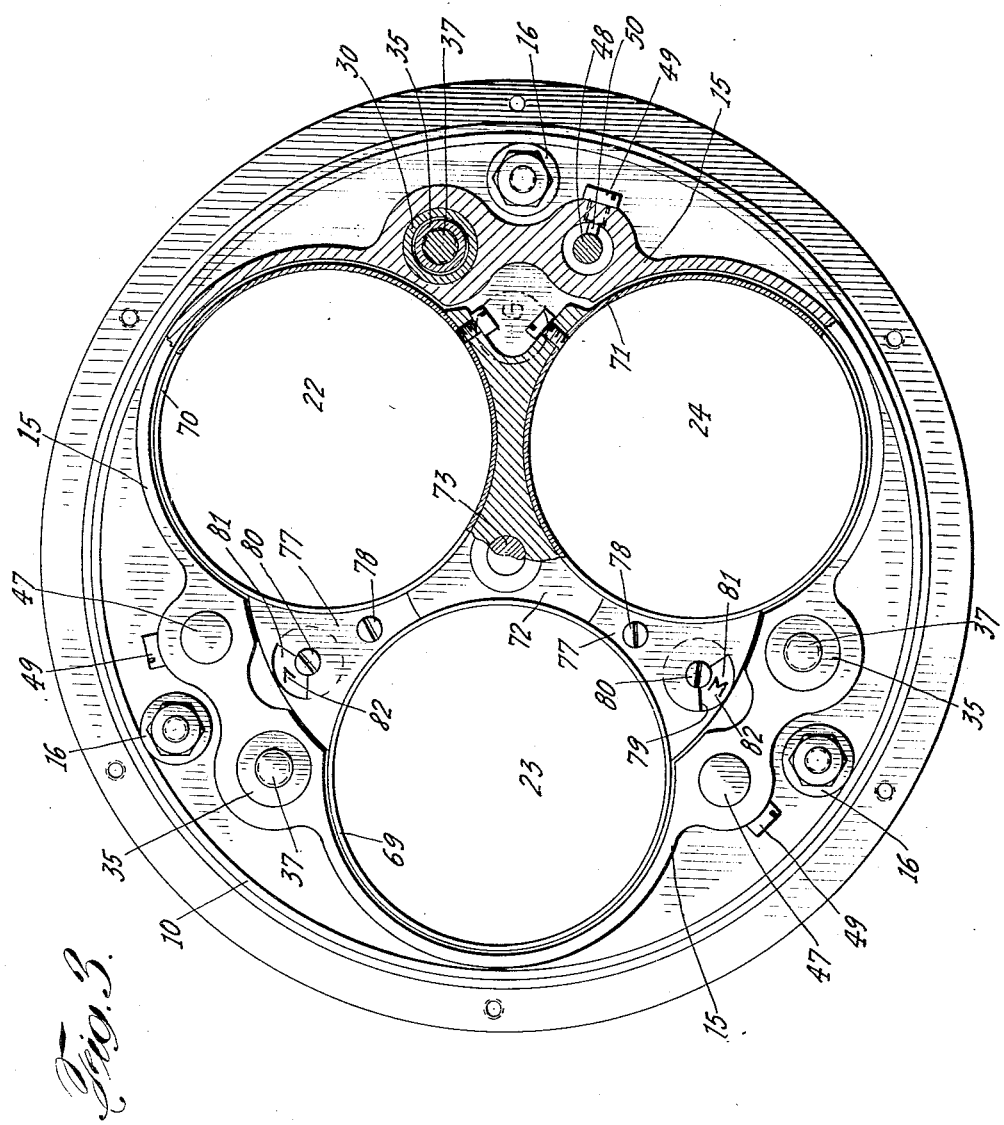

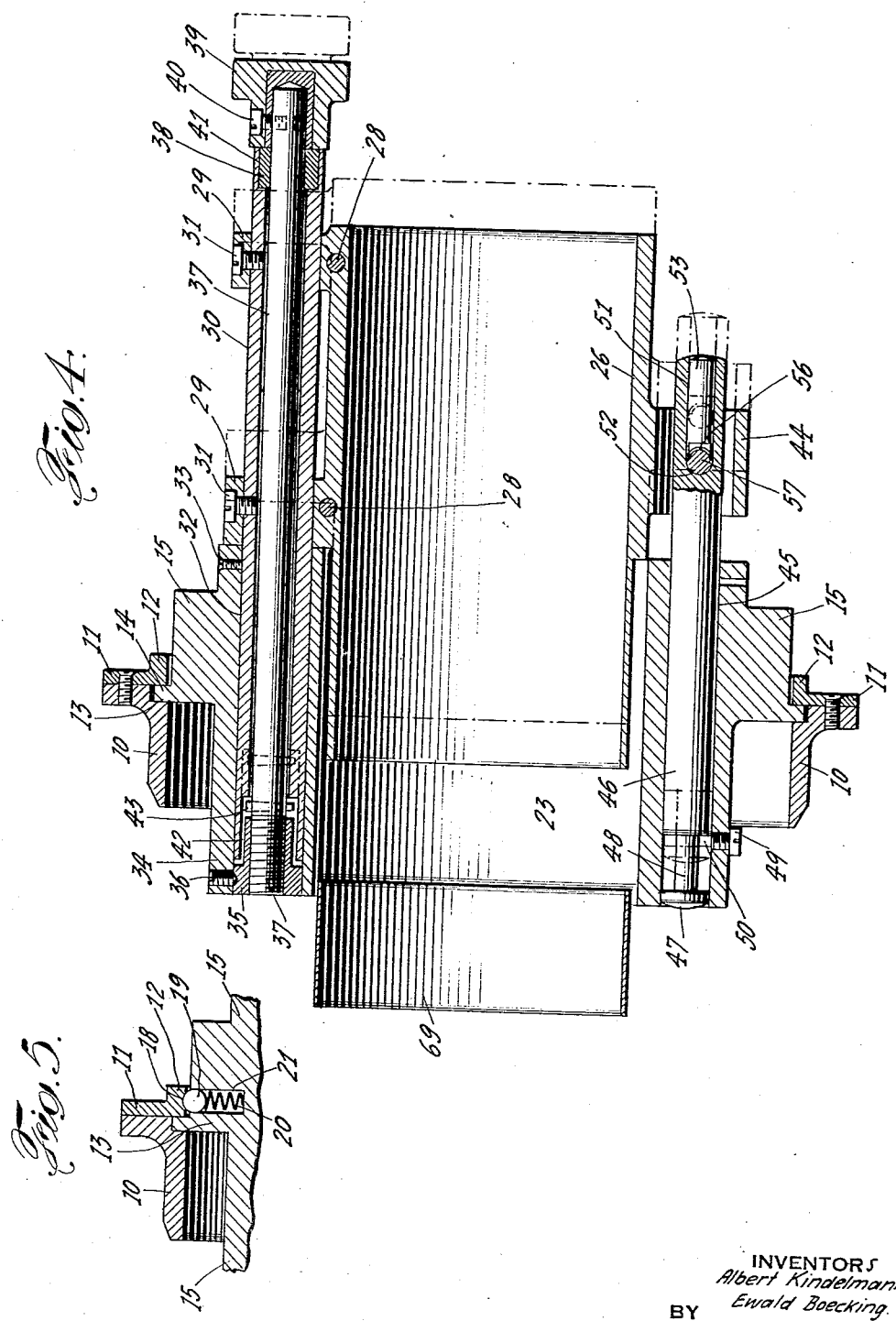

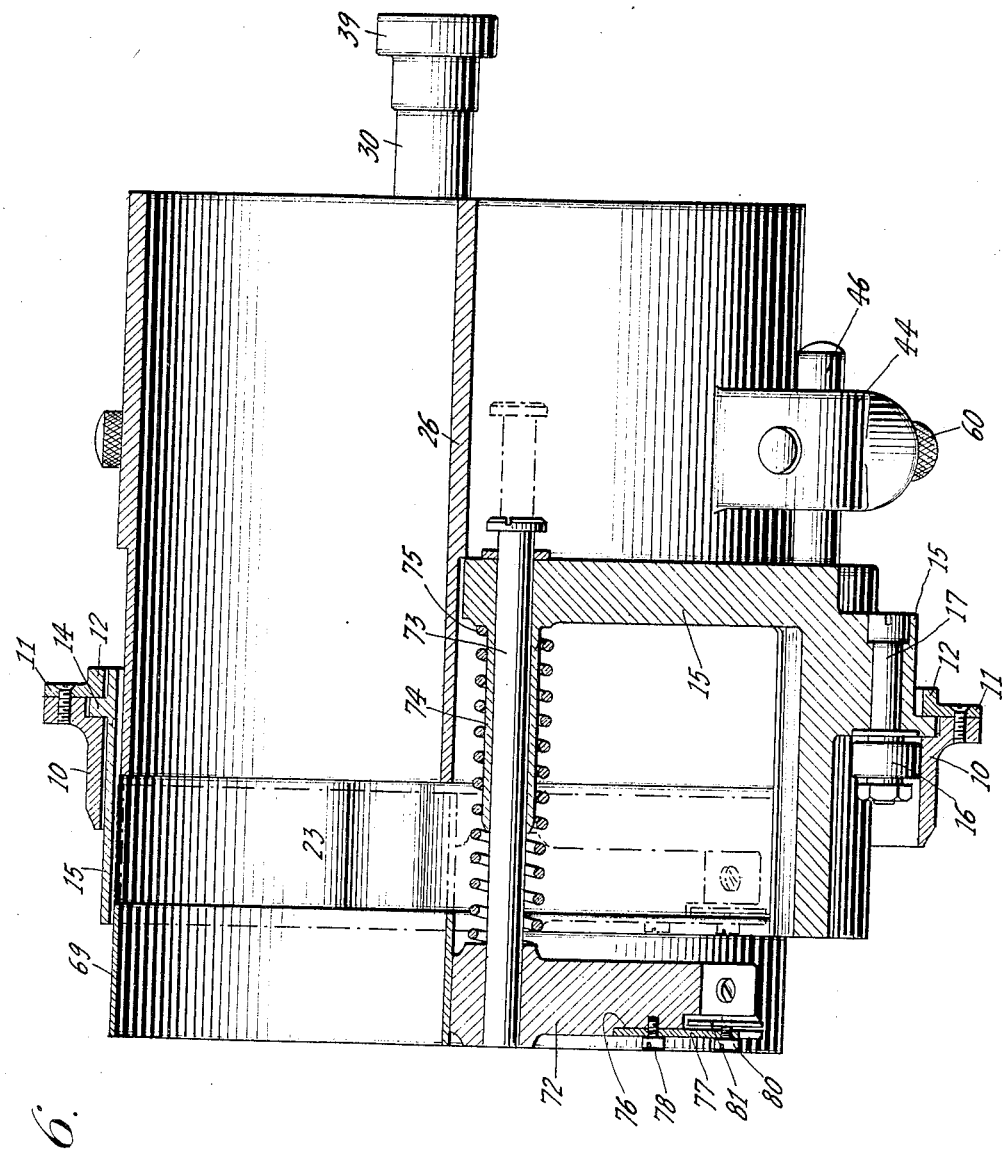

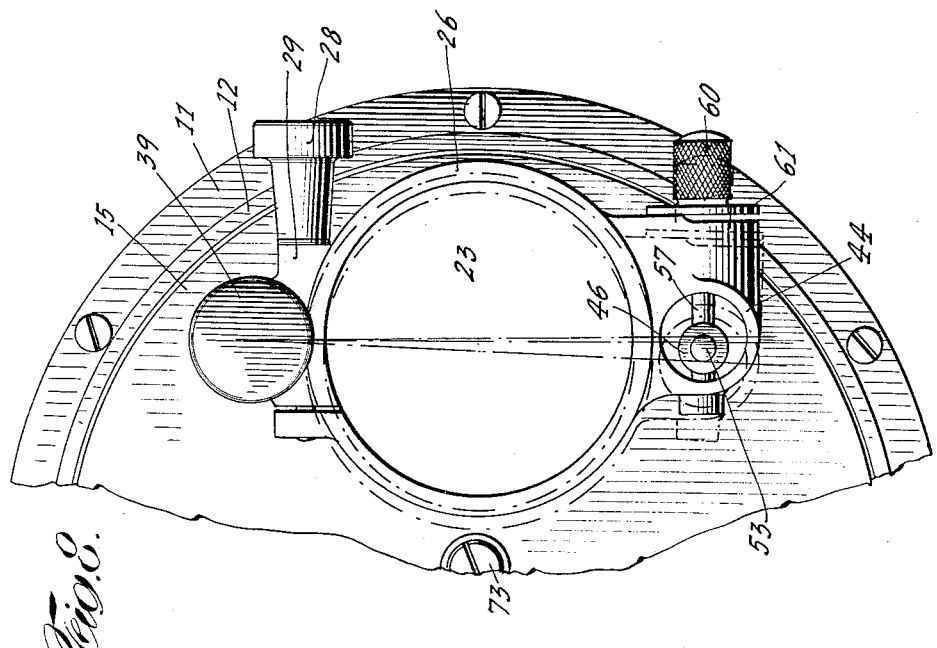
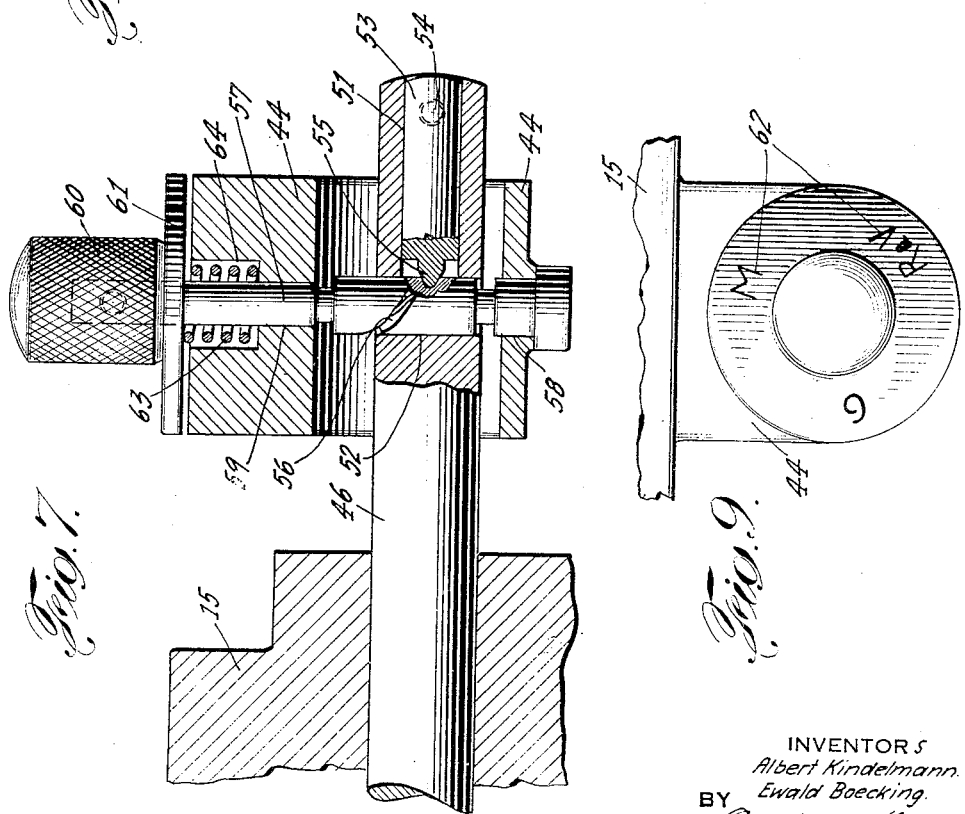

1,883,943

UNITED STATES PATENT OFFICE

ALBERT KINDELMANN, OF FLORAL PARK, AND EWALD BOECKING, OF BROOKLYN, NEW YORK, ASSIGNORS TO INTERNATIONAL PROJECTOR CORPORATION, OF NEW YORK, N. Y., A CORPORATION OF DELAWARE

LENS ADJUSTING, SHIFTING, AND INDICATING MECHANISM

Application filed January 10, 1931. Serial No. 507,832.

This invention relates to motion picture machines and has particular reference to motion picture projectors and especially to lens mounts for use in machines with a plurality of lenses for use in connection with different types of films which are now employed.

A main object of the invention is to provide a combination of focussing and shifting devices whereby the lenses may be focussed and shifted separately of each other and at the same time without regard to the other movements of the machine.

A further object is to provide a focussing and shifting mechanism so constructed and arranged that the one adjustment can be made with or independent of the other without in the least disturbing the operation of the machine in any other respect.

A still further object is to provide a simple compact and efficient mechanism whereby both the focussing and shifting devices will cooperate with each other and the lens turret on which they are mounted to be readily accessible to the hand of the operator and are at all times so constructed that the position and condition of each device will be readily apparent to the eye of the operator.

Further and more specific objects, features, and advantages will more clearly appear from the detailed description given below when taken in connection with the accompanying drawings which form part of the specification and which illustrate one present preferred form of the invention.

In brief general terms the invention comprises a movable support disposed within the frame of the machine and carrying a plurality of lens mounts. This support may be moved in a direct line horizontally or vertically or otherwise or may be disposed to be rotated to bring the lenses successively in line with the main projection opening of the machine. Preferably the lens mounts are disposed on the support by being fastened to a support member which is mounted on the support to slide and turn thereon thereby permitting the lens mount to be moved backward and forward of the lens mount for focussing and at the same time to be shifted to align the several axes with any one of several axes depending upon the type of film being used.

In a machine of this type it is intended to use regular film, regular movietone, film, grandeur film, and grandeur film modified for movietone work. Since the optical centers of the sections of these different types of film differ when disposed in the aperture of the machine it becomes necessary for any given lens associated with said aperture to be able to shift its axis to align it with the axis of whatever film is being used. Therefore, the member which supports the lens mount is is turnably disposed on the support while at the same time slidable back and forth for adjusting purposes. Preferably this support member is in the form of a shaft. By turning a knob associated with said supporting shaft or member threadable connections thereof permit the shaft to be moved back and forth for focussing. In order to shift the lens laterally there is associated with the mount preferably opposite the pivotal axis thereof a simple knob operated device in the form of a turnable shaft connected by suitable mechanism with the mount so that the mount can be shifted horizontally in one direction or another to align it with any one of several axes above mentioned. Therefore, by the manipulation of two simple knobs associated with operating shafts the respective lens mounts can be shifted and focussed at will, or can be manipulated in either of these ways without disturbing the function or position of the other.

Furthermore and in the preferred form, the invention comprises a rotatable turret on which are mounted several lens mounts or elements in which are disposed lens of varying characteristics for use with several different types of film now in use such as the regular film, the grandeur film, the movietone film, and the vitaphone film. The turret can be rotated to position the desired lens in line with the optical axis of projection of the machine. While in position the lens in use can be focussed or shifted to another axis at will and the same action can be taken with the other lenses on the turret whether they are aligned with the projection axis or not. The focussing and the shifting of the lenses can take place simultaneously or at different times as desired. The lens mount in each case is swingable on an axis to shift the lens at right angles to the projection axis and it is along this axis that the focussing device is disposed and the lens moved to focus it.

The present preferred form of the invention is shown in the drawings of which:

Fig. 1 is a front elevation of the turret with certain portions broken away;

Fig. 2 is a side elevation of the turret;

Fig. 3 is a rear elevation of the turret with certain portions broken away;

Fig. 4 is a vertical longitudinal section taken on the line 4—4 of Fig. 1;

Fig. 5 is a transverse section taken on line 5—5 of Fig. 1;

Fig. 6 is a horizontal section taken on the line 6—6 of Fig. 1;

Fig. 7 is an enlarged horizontal section taken on the line 7—7 of Fig. 1;

Fig. 8 is an elevation of a portion of the front of the turret indicating the adjustability of one of the lens mounts; and, Fig. 9 is an enlarged elevation of the face of one of the adjusting elements.

The present preferred form of the invention includes a rotatable turret for a plurality of lenses, which turret is mounted to rotate in a ring element 10, Fig. 4, which may be formed integrally with the main supporting frame of the machine or may be separate element fastened to the frame in any suitable manner. This ring 10 has screwed thereto a ring 11 with a flange 12. The ring 10 is provided with a groove 13 in which rides a projecting flange 14 on the periphery of the turret element 15 and which is held in position in the groove 13 by means of the auxiliary ring 11. As shown particularly in Fig. 6, a roller 16 projects from the inner face of the turret element 15 and is rotatably mounted on a stub shaft 17 journalled in the turret element 15. There preferably are several of these rollers and stub shafts disposed around the inner face of the turret element 15 so that the turret can easily and readily be rotated within the ring 10.

Around the inner face of the ring element 10 there are disposed a plurality of notches or indentations such as 18 at predetermined points and in these notches engage balls such as 19 backed by springs 20 disposed in bores such as 21 in the turret element 15. Preferably the indentations 18 are disposed at equal distances apart and in such positions relative to the ring and the turret element that the lenses mounted on the turret element 15 will be positioned in predetermined positions and latched therein by this means when desired. In the present case this means is used to respectively align one or the other of the lenses on the turret 15 in alignment with the projection axis and to provide a simple and ready means whereby the alignment can be easily effected. Other types of positive locating means may be employed if desired.

The turret element 15 is provided with a plurality of openings extending therethrough and in the form shown there are three indicated by the numerals 22, 23 and 24. These openings are preferably spaced equi-distant angularly in the turret element 15 and through them the projection light passes, one at a time as they are respectively disposed in line with the projection beam axis. At the front of the element 15 and projecting partly into the openings 22, 23 and 24 are disposed lens holding tubes such as 25, 26 and 27. Each of these tubes is provided with the usual tightening screw 28, and has an apertured ear portion 29 to receive an elongated sleeve 30. The sleeve and the ear portions are held together by means of the set screw 31. The sleeve 30 is held in snug sliding engagement within a bore 32 in the turret element 15 as shown particularly in Fig. 4. One end of the sleeve 30 extends into a continuation of the bore 32 which is disposed in a rearwardly extending sleeve 34 projecting from one face of the turret element 15.

In the end of the sleeve 34 there is fixed a plug 35 by means of screw 36. This plug is bored and threaded to receive the threaded end of shaft 37 which extends all the way through the sleeve 30 and extends beyond the same at the opposite end of the sleeve 30. At the free or operating end of the shaft 37 there is fastened thereto a plug 38 and on this plug 38 there is mounted an operating thumb piece 39. The plug 38 and the thumb piece are held on to the shaft 37 by means of the screw 40. The plug 38 fits into a recess 41 in the end of the sleeve 30. The plug 35 in part extends into a recess 42 in the other end of the sleeve 30, and between the inner face of the plug 35 and the inner face of said recess there is disposed on the shaft 37 a key element 43, which is adapted to engage the end of sleeve 30 in one direction of movement of the shaft to move the sleeve.

It will be noticed from Fig. 4 that the inner end of each of the lens tubes such as 26 has sufficient clearance within its respective bore in the turret element 15 so that the tube and associated parts can be swung to new positions to align with different optical axes, thus each lens tube may be moved in respect to the axis of the bore 32 in the turret element 15. This swinging motion is desirable for the purpose of aligning any particular lens with one of several projection axes or with the optical center of one of several types and sizes of films which may be used in this machine.

In order to effect this swinging motion in a suitable and ready manner each of the lens tubes 25, 26 and 27 are provided on some convenient place on their peripheries with an ear such as 44. Disposed on the turret element 15 in line with each of the axes of the ears 44 there is provided a bore such as 45. In this bore which is rather elongated there is slidably disposed a shaft 46. The one end of the shaft 46 has a head 47 and adjacent thereto a reduced portion 48. In the turret element 15 adjacent the reduced portion 48 of the shaft 46 is disposed a set screw 49 having a pin portion 50 extending partly into the bore 45 to act as a stop for the shoulders formed on the shaft 46 by the reduced portion 48 thereof and hereby limit the movement of the shaft 46 in either direction, longitudinally of the projector. The forward end of the shaft 46 extends through the bore in the ear 44 and this portion of the shaft 46 is provided with a longitudinal bore 51 and a transverse bore 52. In the bore 51 there is disposed a stub shaft 53 held therein by screw 54 (Fig. 7), and having on its inner end a tooth 55. This tooth is adapted to engage with a spiral groove 56 in a transverse shaft 57 extending through bore 52 and journalled at 58 and 59 in the ear 44. The outer end of this shaft 57 is provided with a thumb element 60 and an indicator dial or disk 61 on which suitable indications such as 62 may be disposed as desired. A spring 63 is disposed beneath the dial 61 and the bottom of a recess 64 in the ear 44 in which it is disposed. Another bore 65 (Fig. 2) in the ear 44 holds a spring 66 which presses a ball 67 into one or another of several notches or indentations 68 on the under side of the dial 61.

Disposed and housed within the rear face of the turret element 15 are three auxiliary tubes such as 69, 70 and 71, Figs. 4 and 5, the axes of which are in alignment with the axes of the lens tubes 25, 26 and 27 in the front of the turret element 15. These tubes 69, 70 and 71 are mounted on and carried by a spider frame such as 72, (see Fig. 6) mounted on a central rod 73 slidably journalled in a sleeve 74 mounted centrally of the turret element 15 and extending from the rear face thereof. Between the rear face of the turret element 15 and the rear face of the spider member 72 there is disposed a spring 75 around the rod 73 and the sleeve 74. The rod 73 and with it the spider 72 carrying the tubes 69, 70 and 71 may be slid in and out of the turret element 15 and the spring 75 will always tend to keep the tubes in the position outwardly shown in Fig. 6. This position is the one in which these tubes on their outer faces will bear against the adjacent face of a film aperture gate not shown. Between each pair of the tubes 69, 70 and 71 there is disposed on the spider element 72 a shallow depression 76 in which is disposed a triangular plate such as 77, (see Fig. 3) held therein by a screw 78. This plate in each instance has at its bottom a cut 79 therein. Back of the plate 77 adjacent the cut 79 there is rotatably mounted by screw 80 a plate 81 which carries certain indicia such as 82. It will be noted that the indicia 82 are disposed at the rear of the turret in association with the auxiliary tubes, each indicia being disposed adjacent the lenses to which its color and character are limited so that as the lens is aligned with the optical axis, near the center of the machine, its corresponding indicia is disposed opposite it near the top of the machine so that it is readily observable by the operator either through the glass of the door or when the door is open.

*Operation of the device*

Having now described the parts and their assembly and part of their cooperation, the actual functioning will be described.

*To rotate the turret.*—The turret member 15 is merely gripped in the hand turned against the retarding action of the plurality of balls 19 lying in the notches 18 in the ring 12. These notches are so disposed that when the balls lie therein at least one of the lens tubes is in proper alignment with the desired optical axis. When a new lens is to be aligned, the turret is turned until the desired lens is in position and when it is so the balls will click into position, and the operator can tell by the slight resistance thus offered that the proper position has been reached.

The lenses properly located in their holding sleeves are introduced into the holding tubes and are fastened therein by tightening of the screws 28.

*To focus the lenses.*—Referring particularly to Fig. 4, the turning of the thumb piece 39 will turn the shaft 37. This being threaded in the fixed plug 35 will cause the shaft 37 to move to the right or the left in accordance with the turning movement thereof and will advance or withdraw the lens tube which is connected to that particular shaft 37 since the lens tube ear such as 29 is screwed to the sleeve 30. This sleeve 30 is forced to the right by means of pin or key 43 and to the left by means of plug 38. As the lens tubes are thus focused their stop limits are also determined by the pin 50 engaging with the shoulders on the stub shaft 46 at the bottom of the turret 15. This is true because as the ear 44 on each lens tube moves to the right or the left it carries with it the transverse shaft 57 and the stub shaft 46 which slides in the bore 45 of the turret element 15. It will be understood that each lens tube can be thus separately focused. The construction above described with regard to one lens and its holder and operation applies to each and all of them both as to the focussing and as to the lateral shifting of the tubes for the alignment of the same tube with one or more of several different projection axes.

*To shift the lenses laterally.*—Referring to Figs. 4 and 7 particularly, the rotation of the thumb piece 60 will rotate the shaft 57 and by the engagement of the tooth 55 in the spiral groove 56 will laterally shift the ear 44 and thus will likewise shift the lens tube in question in the desired direction and this partial rotation will take place around the axis of the bore 32 of turret member 15 since the lens tube carrying the ear 44 is mounted on the sleeve 30 which is slidably and rotatably mounted in said bore. The dotted center lines shown in Fig. 8 indicate the amount of swing given to the lens mounts upon the axis of sleeve 30 to align the lenses with the various optical axes as above-mentioned, which correspond to the optical axis of the regular film, the movietone film and movietone grandeur film.

The operation of focusing the lenses will not affect the operation of the shift device since the stub shaft 46 as described can move longitudinally to the limits of the stop pin 50 in either direction. The indicia 62 will tell which axis the tube is in alignment with.

*To operate the film aperture gate.*—When the film has to be threaded or taken out of the machine for one reason or the other, it is necessary to pull back the gate from the aperture plate and when this takes place the light tubes such as 69, 70 and 71 must be moved back with the gate against which they normally are in contact. This is effected by reason of the fact that the tubes above mentioned on the spider 72 can be moved back against the action or resistance of the spring 75. The position of the lenses in the turret with respect to the main projection axis will be indicated by the indicia such as 82, see Fig. 3. In the drawings the indicium labelled N will indicate that the lens with which it is associated is to be used in alignment when movietone film is being used in the machine. The indicium G when a wide or grandeur film is employed. The indicium R and V when a regular or vitaphone film is being employed. These same indicia are used on the dial disk 61, Figs. 7 and 9, to indicate the position of the lens shifting apparatus when these respective films are being employed in the projector.

Preferably the indicia for either turning of the turret or the shifting of the lens mounts are designated not only by characters, but by colors so that each lens has an indicia associated with it of a definte color so that when this colored indicator is noted in the indicating position the operator can tell what lens is in alignment within, without looking at the character. The same idea is employed in connection with the associated device for the lens mount so that the operator can tell by color alone just what associated position any particular lens is in.

*General operation of the machine.*—It will be assumed that the projector is employing a movietone film. In this instance the turret is moved or rotated so that the indicia M is disposed to the right hand position at the rear thereof as shown in Fig. 3 since each indicia refers to the lens tube disposed opposite to it at the back of the turret. The shift thumb piece is then rotated until the indicia M on the dial disk 61 is in position indicating that the axis of the lens has been aligned with the axis of the center of the movietone film. The lens tube can be focused by means of the knob 39 associated therewith and this can be done while the tube is being shifted or while the turret is being rotated since those various adjustments are independently operable. When the turret is properly aligned the balls will be in the notches and this reception will be felt by the operator so that he will know that the proper position has been achieved. When another film is being used such as the grandeur the operation is repeated to bring the tube marked G opposite the proper axis and the dial disk 61 again manipulated to bring the optical of that lens in alignment with the center of that particular type of film. And so again for the regular film and the vitaphone film the same manipulations are carried out to thereby align the parts as above described. It will be noted that the shifting device and the focusing device has been described in detail and shown in detail with regard to one lens tube but it is to be understood that each tube has a shift and a focusing device and each of these devices can be operated independently of the other. This apparatus permits the introduction of lenses of any desired focal lengths for the films to be run.

It will therefore be obvious that the support which is movable in any desired direction to bring one or another of the lenses in alignment with the main projection aperture, is provided with two simple manually operable shafts or equivalent devices, one of which is operable to focus the lens mounts and the other of which is operable to shift the lens mounts laterally for the purpose above mentioned. Both operations can take place at once or they can be independently achieved. In other words having focussed the lens, the operator can shift it without effecting the focussed position or the operator having shifted the lens can focus it without effecting the axially shifted alignment. Preferably the shifting device is associated with colored or marked indicia so that as the shift takes place these indicia are respectively presented to the notice of the operator to accurately and clearly indicate to him the particular positions to which the lens has been shifted. He, therefore, can instantly tell with what axis the lens is aligned. Suitable stop means connected with the shaft and with the focussing device will permit the proper determination of the extreme movement in either direction. Shifting is effected by turning the lens mount on a pivotal supporting member. This supporting member in the present preferred form is a shaft preferably hollow which can not only turn but slide longitudinally on the support, so that the one member not only supports the lens mounts but is actually movable and turnable to achieve the shifting of the lenses.

The present preferred form of the invention has been described and shown in detail and with respect to a present preferred form thereof but it is not intended to limit the invention to such details and forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed, is,

1. In a motion picture machine, a frame, a support thereon, a lens holding turret disposed on said support, a plurality of lens mounts on the turret, means projecting from the turret to support each mount, said means being turnable and longitudinally slidable on the turret, means for longitudinally moving the mount to focus the lenses, means for shifting the mounts on the supports to align the lenses with several projection axes, means for indicating the shifted positions, means for turning the turret within the support, means for latching the turret in several positions, and means for indicating the position to which the turret is turned.

2. In a motion picture machine, a frame, a supporting ring thereon, a rotatable lens holding turret disposed within said ring, a plurality of lens mounts on the turret, means projecting from the turret to support each mount, said means being turnable and longitudinally slidable on the turret, means for longitudinally moving the mount to focus the lenses, means for shifting the mounts on the supports to align the lenses with several projection axes, means for indicating the shifted positions, means for turning the turret within the ring, means for latching the turret in several positions, and means for indicating the position to which the turret is turned.

3. In a motion picture machine, a frame, a supporting ring thereon, a rotatable lens holding turret disposed within said ring, a plurality of lens mounts on the turret, sleeves projecting from the turret to support each mount, said sleeves being turnable and longitudinally slidable in the turret, an adjustable shaft cooperating with the turret and the sleeve to longitudinally move the mounts with respect to the turrets, a second turnable shaft on each mount, and engaging with a portion of the turret to shift the mount laterally, means to limit the longitudinal movement of the sleeve, and means to indicate the position to which the mount is laterally shifted.

4. In a motion picture machine, a frame, a supporting ring therein, a rotatable lens holding turret disposed within said ring, a plurality of lens mounts on said turret, said turret having a bore adjacent each mount, a sleeve in each bore on which said mount is supported, said sleeve and mount being disposed within the bore for lateral and longitudinal movement, means on the sleeve to move the mount longitudinally of the bore, means on the mounts and cooperating with means on the turret to shift each mount to align its axis with one or more of several projection axes, and means on the mount to indicate the several adjusted positions of the mounts.

5. In a motion picture machine, a frame, a supporting ring therein, a rotatable lens holding turret disposed within said ring, a plurality of lens mounts on said turret, said turret having a bore adjacent each mount, a sleeve in each bore on which said mount is supported, said sleeve and mount being disposed within the bore for lateral and longitudinal movement, an adjusting shaft on the sleeve and having threaded relation to the turret, means on the adjusting shaft to engage the sleeve and move it in either direction when the adjusting shaft is moved and turned, a rotatable shaft on each mount, a shaft in fixed position on the turret but capable of sliding and turning therein, means on the two last mentioned shafts cooperating with each other to shift the mount when the rotatable shaft is turned.

6. In a motion picture machine, a frame, a supporting ring therein, a rotatable lens holding turret disposed within said ring, a plurality of lens mounts on said turret, said turret having a bore adjacent each mount, a sleeve in each bore on which said mount is supported, said sleeve and mount being disposed within the bore for lateral and longitudinal movement, a rotatable shaft on each mount, a shaft in fixed position on the turret but capable of sliding and turning therein, means on the two last mentioned shafts cooperating with each other to shift the mount when the rotatable shaft is turned, and means on the rotatable shaft to indicate the position to which the mount has been moved.

7. In a motion picture machine, a frame, a supporting ring therein, a rotatable lens holding turret disposed within said ring, a plurality of lens mounts on said turret, said turret having a bore adjacent each mount, a sleeve in each bore on which said mount is supported, said sleeve and mount being disposed within the bore for lateral and longitudinal movement, an adjusting shaft, on the sleeve, a threaded plug in the turret engaging with the adjusting shaft, means adjacent each end of the adjusting shaft to engage the sleeve and move it in one direction or the other as the adjusting shaft is turned, a rotatable shaft on each mount, a shaft in fixed position on the turret but capable of sliding and turning therein, and associated with each mount, cooperating teeth and grooves on the two last mentioned shafts to move the mounts laterally when the rotatable shafts are moved.

8. In a motion picture machine, a frame, a supporting ring therein, a rotatable lens holding turret disposed within said ring, a plurality of lens mounts mounted on said turret, said turret having a bore adjacent each mount, a sleeve in each bore on which said mount is supported, said sleeve and mount being disposed within the bore for lateral and longitudinal movement, an adjusting shaft on the sleeve, a threaded plug in the turret engaging with the adjusting shaft, and projections on the adjusting shaft at each end of the sleeve to engage with the sleeve and move it and the mount in one direction or the other as the adjusting shaft is turned, a rotatable shaft on each mount, a shaft in fixed position on the turret but capable of sliding and turning therein, and associated with each mount, cooperating teeth and grooves on the two last mentioned shafts to move the mounts laterally when the rotatable shafts are moved, and means on the mounts to indicate the position to which the mounts have been moved.

9. In a motion picture machine, a frame, a supporting ring thereon, a rotatable lens holding turret disposed within said ring, a plurality of lens mounts on the turret, means projecting from the turret to support each mount, said means being turnable and longitudinally slidable on the turret, means for longitudinally moving the mount to focus the lenses, means for shifting the mounts on the supports laterally to align the lenses with several projection axes, means for indicating the shifted positions, means for turning the turret within the ring, means for latching the turret in several positions, means for indicating the positions to which the turret is turned, a series of light tubes on the turret opposite the lenses, a spider for supporting the tubes means for sliding the spider and the tubes to and away from the turret, and means on the spider for indicating the lens in line with the projection axis at any given position of the turret.

In testimony whereof we have hereunto set our hands.

ALBERT KINDELMANN.
EWALD BOECKING.